United States Patent Office 3,063,793
Patented Nov. 13, 1962

3,063,793
PRODUCTION OF HIGH DENSITY SINTERED URANIUM OXIDE
Harold Rawson, Rugby, and Charles Anthony Elyard, Leamington Spa, England, assignors to Associated Electrical Industries Limited, London, England, a British company
No Drawing. Filed July 11, 1960, Ser. No. 41,767
Claims priority, application Great Britain July 15, 1959
6 Claims. (Cl. 23—14.5)

This invention relates to the production of a sintered uranium dioxide ($UO_2$) ceramic of high density for use as a reactor fuel. By high density is meant a density of greater than 95% of the theoretical maximum density which is 10.97 grams per cc.

It has been found that when a ceramic form of uranium dioxide is subjected for long periods of time at high temperature to the conditions which obtain in a nuclear reactor, gases, in particular xenon and krypton, produced by fission of the $U^{235}$ nuclei, diffuse out of the ceramic at a rate determined by its temperature and density. The evolution of xenon and krypton will, if the ceramic is encased in a can, as is usual with reactor fuel elements, produce a high gas pressure within the can, and there is a risk that the can will burst.

The rate at which these gases are evolved is reduced considerably by sintering the material to a density greater than 95% of the theoretical density. High density can be achieved by sintering compacted powdered $UO_2$ in hydrogen at a temperature of about 1700° C. for long periods of time.

The main object of the invention is to provide a process for obtaining compacted uranium oxide with a higher degree of density than heretofore at a less cost.

According to the present invention, sintered uranium dioxide ceramic material of high density is produced by using as the starting material a mixture of an oxide of uranium in the composition range $UO_{2.1}$ up to $UO_{2.25}$ in such condition as to possess a surface area of the order of 2 square metres per gram, with up to 0.1%, by weight, platinum uniformly dispersed over the surface of the particles comprising the oxide.

It is to be noted that uranium dioxide in the stoichiometric ratio will normally acquire oxygen from the atmosphere unless it is kept in an inert atmosphere or otherwise protected by enclosure in a sealed container. Uranium oxide containing oxygen in excess of the stoichiometric ratio $UO_2$ may also be purchased.

Uranium oxide possessing a surface area of the order of 2 square metres per gram corresponds with a particle size of less than 0.5 micron.

The platinum may be added to the uranium oxide in an amount corresponding to approximately 0.05%, by weight, in the form of a water solution of a platinum compound, e.g. the complex chloride $(NH_4)_2PtCl_6$, the oxide being mixed with the solution to form a damp paste. For example, an addition of 17 ccs. of a 0.66% solution of $(NH_4)_2PtCl_6$ in distilled water to 100 gms. of the uranium oxide gives a pasty mass of a desirable consistency with the required percentage of platinum. The paste has to be heated to a temperature of 500° C. in an inert atmosphere, e.g. argon, in order to decompose the platinum compound and leave metallic platinum dispersed throughout the mass of oxide. Ammonia and chlorine are evolved during the heating. Whilst the decomposition of the platinum compound may be relied upon to take place during the sintering of the treated uranium oxide powder subsequent to its having been fabricated into a desired form, it is preferable to effect this before fabrication and sintering, thus avoiding the evolution of gases during the sintering process.

The platinum treated uranium oxide powder is fabricated into shapes by conventional ceramic techniques, e.g. die pressing, slip casting, extrusion, etc. When the treated powder has been heated to cause the decomposition of the platinum compound, and the fired powder is to be made into a slip for casting or extrusion, distilled water may be added to the fired powder and the mixture ball-milled to provide a paste of the desired consistency. After fabrication, the shaped body is subsequently sintered at a temperature of approximately 1400° C. in a neutral atmosphere, e.g. purified argon for a period of about ten hours. After sintering the material is given a second firing in hydrogen at 1200° C. for a period of about two hours to cause the oxide to revert wholly to $UO_2$ in which form it is preferred for use as a reactor fuel. Since $UO_2$ is stable in hydrogen, the firing in hydrogen does not reduce the oxygen content to below the stoichiometric ratio. It is believed that the presence of platinum distributed over the surface of the particles of the oxide impedes grain growth of the oxide, and resists the tendency for pores present in the compacted material to be enclosed within the grains. Pores are thus more readily eliminated during the sintering process. We do not, however, desire to be bound by this possible explanation of the improvements obtained by the invention.

As an example, uranium oxide ($UO_{2.14}$) admixed with platinum was pressed into pellets at a pressure of 20 tons/in.$^2$ and sintered in argon at 1360° C. for ten hours, and was subsequently hydrogen reduced. This material had a density of 10.73 grams per cc. Similar uranium oxide which was not admixed with platinum, but which was otherwise processed in the same way, gave a density of 10.53 grams per cc. In another case the platinum treated powder was pressed at 40 tons/in.$^2$ and sintered under the condition described above. This gave a density of 10.90 grams per cc.

What we claim is:

1. A process for obtaining a ceramic body of uranium dioxide which consists in compacting a mixture of powdered oxide of uranium in the composition range $UO_{2.1}$ to $UO_{2.25}$ with up to 0.1%, by weight of platinum uniformly dispersed therein, the powder having a surface area of about 2 square meters per gram, and heating the compacted mixture in conditions such as to reduce the oxide to the $UO_2$ composition and sinter the compacted mixture.

2. A process for obtaining a ceramic body of uranium dioxide which consists in forming, with a water solution of a platinum salt, a pasty mixture of a powdered oxide of uranium in the composition range $UO_{2.1}$ to $UO_{2.25}$, the powdered oxide of uranium having a surface area of the order of 2 square meters per gram, said pasty mixture containing up to 0.1%, by weight, of platinum, heating the mixture in an inert atmosphere to decompose said salt and produce a mass of said oxide with platinum uniformly dispersed therein, compacting the oxide into a coherent body and sintering the compacted mixture at a temperature of about 1400° C.

3. A process as claimed in claim 2, in which the platinum salt is the complex chloride $(NH_4)_2PtCl_6$.

4. A process as claimed in claim 2, in which the sintered compacted body is heated in hydrogen at a temperature of 1200° C. to reduce the oxide to uranium dioxide of composition $UO_2$.

5. A process as claimed in claim 2, in which the oxide is compacted at a pressure of from 20 to 40 tons/in.$^2$.

6. A process of producing a ceramic body of uranium dioxide which consists in forming, with a water solution of a platinum salt, a pasty mixture of a powdered oxide of uranium in the composition range $UO_{2.1}$ to $UO_{2.25}$, the powdered oxide of uranium having a surface area of the order of 2 square meters per gram, said pasty mixture containing up to 0.1% by weight of platinum, compacting the pasty mixture into a desired shape, heating the compacted mixture to a temperature of about 1400° C. in an inert atmosphere to cause said salt to decompose and leave platinum dispersed uniformly throughout said mixture, and to sinter said mixture into a ceramic body, and then heating said ceramic body to a temperature of 1200° C. in hydrogen to reduce said oxide to uranium dioxide of composition $UO_2$.

References Cited in the file of this patent

UNITED STATES PATENTS 2,599,946   Sheft et al. _____ June 10, 1952

OTHER REFERENCES

Belle: "2nd United Nations Conf. on Peaceful Uses of Atomic Energy," vol. 6, pp. 569–589, September 13, 1958.

Chalder et al.: "2nd United Nations Conf. on Peaceful Uses of Atomic Energy," vol. 6, pp. 590–604, September 13, 1958.

Bel et al.: "2nd United Nations Conf. on Peaceful Uses of Atomic Energy," vol. 6, pp. 612–620, September 13, 1958.